US012585636B2

(12) United States Patent
Thunuguntla et al.

(10) Patent No.: US 12,585,636 B2
(45) Date of Patent: Mar. 24, 2026

(54) RESOURCE EFFICIENT PARTIAL BOOTSTRAP

(71) Applicant: Intuit Inc., Mountain View, CA (US)

(72) Inventors: Saikiran Sri Thunuguntla, Bangalore (IN); Vishal Reddy Baddam, Bangalore (IN); Santhosh Kumar H M, Bangalore (IN); Tushar Singhal, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/660,984

(22) Filed: May 10, 2024

(65) Prior Publication Data

US 2025/0348476 A1 Nov. 13, 2025

(51) Int. Cl.
*G06F 16/20* (2019.01)
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC .............................. G06F 16/2379; G06F 16/27
See application file for complete search history.

(56) References Cited

U.S. PATENT DOCUMENTS

| | | | | |
|---|---|---|---|---|
| 8,818,971 | B1 * | 8/2014 | Fontoura ................. | G06F 16/41 |
| | | | | 707/711 |
| 2014/0330780 | A1 * | 11/2014 | Chen ........................ | G06F 16/27 |
| | | | | 707/625 |
| 2017/0206232 | A1 | 7/2017 | Dean et al. | |
| 2017/0220944 | A1 | 8/2017 | Nghiem | |
| 2018/0203744 | A1 | 7/2018 | Wiesmaier et al. | |
| 2019/0138345 | A1 | 5/2019 | Singh et al. | |
| 2020/0026710 | A1 | 1/2020 | Przada et al. | |
| 2020/0126010 | A1 | 4/2020 | Gundavelli et al. | |
| 2023/0004538 | A1 | 1/2023 | Kumar et al. | |
| 2023/0394013 | A1 * | 12/2023 | Hekimian-Williams .................... | |
| | | | | G06F 16/278 |
| 2024/0184784 | A1 * | 6/2024 | Xie ................... | G06F 16/24556 |

* cited by examiner

*Primary Examiner* — Kristopher Andersen
(74) *Attorney, Agent, or Firm* — Paradice & Li LLP

(57) ABSTRACT

Systems and methods are disclosed for a resource efficient partial bootstrap of one or more databases. Instead of the typical requirement of deleting all data from a destination database and performing a full bootstrap when deletions in data at a data source occurs, implementations herein disclose a resource efficient partial bootstrap process to identify deletions in data at the data source and update the destination database accordingly without requiring a full bootstrap. To perform partial bootstrapping, a system compares the set of data keys from a source index at the data source with the set of data keys from a destination index at the destination database to identify a difference between the two sets of data keys. The system then deletes the data keys in the destination index that do not appear in the source index (as identified in the difference between the two sets of data keys).

20 Claims, 5 Drawing Sheets

400

Receive a request to perform a bootstrap of a destination database based on a data parameter. 402

A full bootstrap of the destination database was previously performed and the destination database is active. 404

Retrieve a first plurality of data keys from a destination index of the destination database storing the data. 406

The data keys point to the data stored in the destination database. 408

Retrieve a second plurality of data keys from one or more source indexes of one or more source databases storing the data. 410

The data keys point to the data stored in the one or more source databases. 412

Calculate a difference between the first plurality of data keys and the second plurality of data keys. 414

The difference includes one or more data keys included in the first plurality of data keys and not included in the second plurality of data keys. 416

Delete the one or more data keys from the destination index to generate an updated destination index. 418

Delete the data in the destination database corresponding to the one or more data keys deleted from the destination index. 420

Figure 4

500

| Delete the data in the destination database corresponding to one or more data keys to be deleted from the destination index. 502 |
|---|

↓

| Retrieve a plurality of domain event records stored for the one or more source databases based on the data parameter. 504 |
|---|
| The plurality of domain event records correspond to a subset of data stored in the one or more source databases. 506 |

↓

| Pull exclusively the subset of data stored in the one or more source databases corresponding to the plurality of domain event records. 508 |
|---|

↓

| Merge the pulled subset of data into the destination database. 510 |
|---|

Figure 5

RESOURCE EFFICIENT PARTIAL BOOTSTRAP

TECHNICAL FIELD

This disclosure relates generally to the bootstrapping of databases, including a resource efficient partial bootstrapping of one or more databases.

DESCRIPTION OF RELATED ART

Databases are used to store and manage data for various activities. For example, an online transaction processing (OLTP) database manages data from online transactions (such pages accessed by users accessing a website or online platform, interactions with the platform, and so on). An online analytical processing (OLAP) database manages data collected for such online transactions (such as information regarding the users accessing the website or online platform, including number of unique visitors, peak number of visitors, and so on). Databases are organized by index tables pointing to storage locations storing specific data. With one or more index tables indexing the stored data, data to be used may be accessed from the database by searching the index tables for the specific data to be obtained, identifying the storage location of the data from the index table, and accessing the storage location in the database. Data may be read from and written to the database, with the index tables being updated to indicate changes to the database (such as including a changelog and updating the affected entries in the index tables).

When a database is to be reconstructed, the data to be managed by the database is to be written into storage of the database, and the index tables to index the stored data are to be generated or updated. Loading the data into the database and otherwise reconstructing the database may be referred to as "bootstrapping." When a database is initialized in order to be active for the first time or to be fully reconstructed (such as when data types change in the data sources), all of the data to be stored by the database is to be loaded into the database and the database initialized, which may be referred to as a "full bootstrap." When only a portion of the database is to be reconstructed, with only a portion of the data to be managed by the database being updated, the partial loading or updating of data and reconstructing the database is referred to as a "partial bootstrap."

SUMMARY

Systems and methods are disclosed for a resource efficient partial bootstrap of one or more databases. When change data events occur at a data source, a destination whose data is synchronized with the data source updates its data based on data changes observed at the data source. Changes that are typically observed are additions to the dataset and updates to data in the dataset. However, deletions of data in the dataset are not typically observed. Alternative to the typical requirement of deleting all data from a destination database and performing a full bootstrap of the destination database when deletions in data at a data source occurs, implementations herein disclose a resource efficient partial bootstrap process to identify deletions in data at the data source and update the destination database accordingly without requiring a full bootstrap.

To perform partial bootstrapping when deletions occur at the data source, a system compares the set of data keys of the data in the data source, which are indexed in a source index, with the set of data keys of the data in the destination database, which are indexed in a destination index, to identify a difference between the two sets of data keys. The system then deletes the data keys in the destination index that do not appear in the source index (as identified in the difference between the two sets of data keys). In this manner, with the destination database storage locations storing the data that was deleted from the data source no longer being indexed, the storage locations may be identified as being available for storing additional data (thus allowing the previously stored data to be overwritten). In some implementations, the data at the destination database storage locations is also deleted when deleting the corresponding data keys from the destination index.

One innovative aspect of the subject matter described in this disclosure can be implemented as a computer-implemented method for partial bootstrapping a destination database. The method includes receiving a request to perform a bootstrap of a destination database based on a data parameter, with a full bootstrap of the destination database having been previously performed and the destination database being active. The method also includes retrieving a first plurality of data keys from a destination index of the destination database storing the data, with the data keys pointing to the data stored in the destination database. The method further includes retrieving a second plurality of data keys from one or more source indexes of one or more source databases storing the data, with the data keys pointing to the data stored in the one or more source databases. The method also includes calculating a difference between the first plurality of data keys and the second plurality of data keys. The difference includes one or more data keys included in the first plurality of data keys and not included in the second plurality of data keys. The method further includes deleting the one or more data keys from the destination index to generate an updated destination index.

Another innovative aspect of the subject matter described in this disclosure can be implemented in a computing system for partial bootstrapping of a destination database. An example system includes one or more processors and a memory storing instructions that, when executed by the one or more processors, cause the system to perform operations. The operations include receiving a request to perform a bootstrap of a destination database based on a data parameter, with a full bootstrap of the destination database having been previously performed and the destination database being active. The operations also include retrieving a first plurality of data keys from a destination index of the destination database storing the data, with the data keys pointing to the data stored in the destination database. The operations further include retrieving a second plurality of data keys from one or more source indexes of one or more source databases storing the data, with the data keys pointing to the data stored in the one or more source databases. The operations also include calculating a difference between the first plurality of data keys and the second plurality of data keys. The difference includes one or more data keys included in the first plurality of data keys and not included in the second plurality of data keys. The operations further include deleting the one or more data keys from the destination index to generate an updated destination index.

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 4 shows an illustrative flow chart of an example operation of partial bootstrapping a destination database, according to some implementations.

FIG. 5 shows an illustrative flow chart of an example operation for synchronizing a destination database during a partial bootstrap, according to some implementations.

Like numbers reference like elements throughout the drawings and specification.

DETAILED DESCRIPTION

Figure 1:
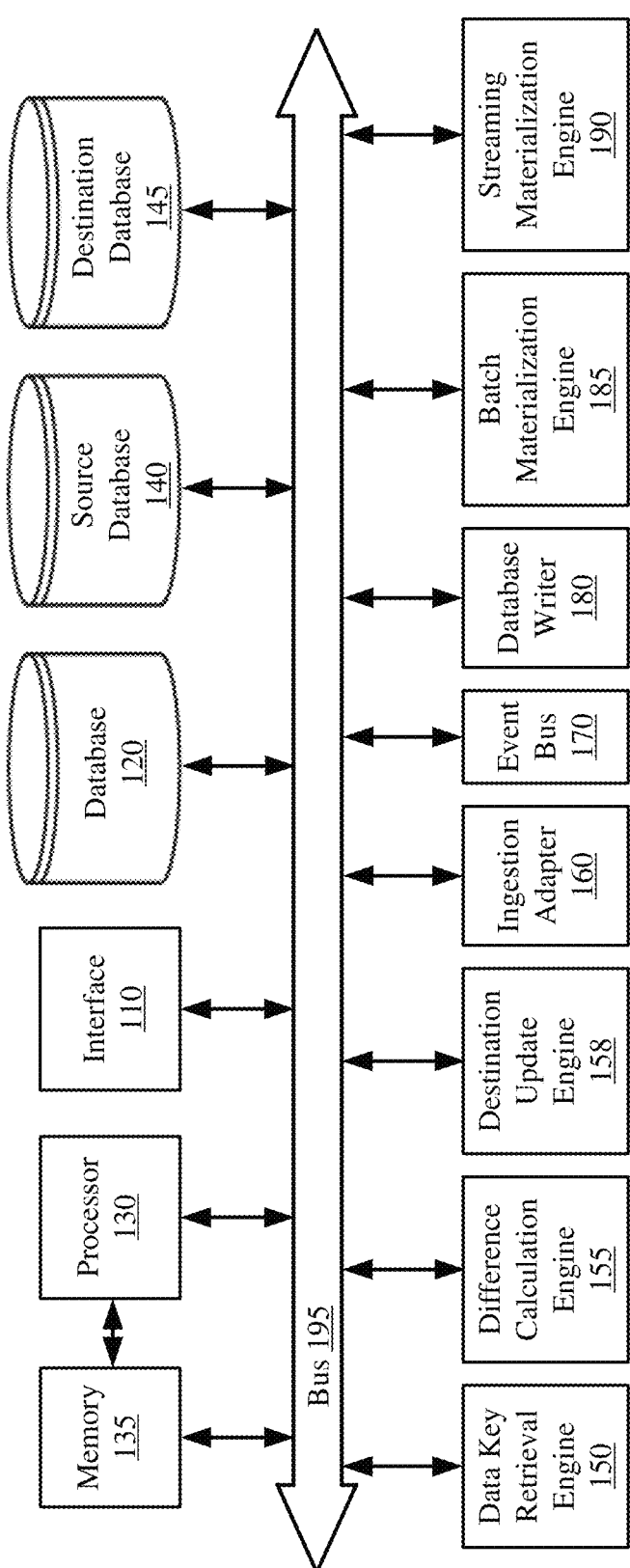
FIG. 1 shows an example system for bootstrapping a destination database, according to some implementations.

Implementations of the subject matter described in this disclosure may be used for the bootstrapping of databases, including a resource efficient partial bootstrap of one or more destination databases.

When a full bootstrap of a database is performed (such as when the database is first initialized or the database is to be reconstructed), the data to be managed by the database is pulled from other databases and written to the storage of the database. Index tables indexing the stored data are also generated in order to manage the data (such as for reading from and writing to the database or for performing other queries on the data). Because a full data management system may be reconstructed or initialized from a full bootstrap (with the entirety of the data to be managed being reloaded to the system), a full bootstrap may take significant processing resources and time to complete. In addition, the system is unavailable during the full bootstrap such that the service being provided by the system may be suspended. As such, if a database is to be updated without being completely reconstructed (such as to ensure the synchronization of data between a data source and the database), a partial bootstrap may be performed, which may include updating only a portion of the data to be managed by the database as well as the index table entries of the database impacted by the update in data. In comparing a partial bootstrap to a full bootstrap, the amount of time that a data management system is unavailable is reduced or eliminated, and the processing resources required to perform a partial bootstrap are lower than the processing resources required to perform a full bootstrap. For example, for a full bootstrap, a single job is created from a software platform indicating the data to be pulled and stored on the database. Traditionally, the single job is executed as a single process, such as a job from an Apache Spark (Spark) engine. The Spark engine, as a distributed processing system, allocates distributed resources from the system to execute the job, and the resources execute the job to completion. If errors occur, the resources may be increased until the job is able to be executed to completion. Comparatively, a partial bootstrap may be performed as a simpler Java program running on one device (such as a Spark node), with not all of the data stored at a destination being impacted. As such, less processing resources and time are required.

To perform a partial bootstrap, a system may receive change or domain events indicating changes to the data stored at a data source to which a destination database is synchronized. For example, a change event may indicate that data was added or that data was updated. As such, a partial bootstrap may be performed based on the events, with the events from the data source being used to identify the data to be updated or added to the destination database. For example, a destination database may synchronize nightly with the data source, using the events to perform a partial bootstrap each night.

One problem with such an approach towards partial bootstraps is that a data source does not generate an event when data is deleted from the data source. As a result, while a partial bootstrap may be used to handle additions or updates to the data, such partial bootstraps cannot be used to handle deletions to data. As time passes and more data is deleted from a data source, a destination database becomes less synchronized to the data source (with data integrity being reduced). As such, typical systems require that a destination database be periodically reconstructed using a full bootstrap to ensure data integrity. As noted above, a full bootstrap may require significant time and processing resources, which may be undesirable, especially for time critical services.

As such, there is a need for a time and resource efficient partial bootstrap that addresses the problems noted above without requiring the need for a full bootstrap.

As described herein, a system and method of an innovative partial bootstrap to update a destination database is configured to handle deletions to data at a data source and update the destination database appropriately. In particular, the partial bootstrap process causes the system to compare the data stored at the data source to the data stored at the destination database to ensure there is no data at the destination database that is not stored at the data source (and thus is to be deleted). To compare the data between the data source and the destination database for a partial bootstrap, the system is configured to access the data source index table and retrieve the source data keys of the source data stored at the data source. The system is also configured to access the destination database index table and retrieve the destination data keys of the destination data stored at the destination database. The system thus executes a comparison operation between the source data keys and the destination data keys to identify destination data keys not included in the source data keys. Such destination data keys indicate the data that was previously deleted from the data source but is still being stored at the destination database. As such, the system again accesses the destination index table and deletes the rows including the identified data keys, thus indicating that the storage locations of the destination database storing data that was indexed by the deleted rows are no longer allocated (and thus allowed to be written with new data). In some implementations, the system also deletes the old data from those storage locations. In this manner of a partial bootstrap, a destination database may maintain data integrity even when data is deleted from a data source, with a partial bootstrap requiring less time and processing resources than a full bootstrap.

To note, to further reduce the time and processing resources required to perform a partial bootstrap, the partial bootstrap may be based on a data parameter that limits the data that may be impacted by the partial bootstrap. In some implementations, the data parameter may be a time period, a specific set of data keys, or a shard. In this manner, data that does not correspond to the data parameter is excluded from being impacted by the partial bootstrap. For example, if a specific disc of a destination database had a corruption issue for which some of the data on the disc was impacted, the data parameter may be defined as the specific disc, with data indexed as being stored on the disc being the only data to be impacted by the partial bootstrap.

Various implementations of the subject matter disclosed herein provide one or more technical solutions to networking and databases. As such, various aspects of the present disclosure provide a unique computing solution to a unique computing problem that did not exist prior to the use of databases and computer networks. In addition, the required reading and writing of electronic data in a specific manner between databases to perform a bootstrap cannot be performed in the human mind, much less practically in the human mind, even if pen and paper are used.

Figure 2:
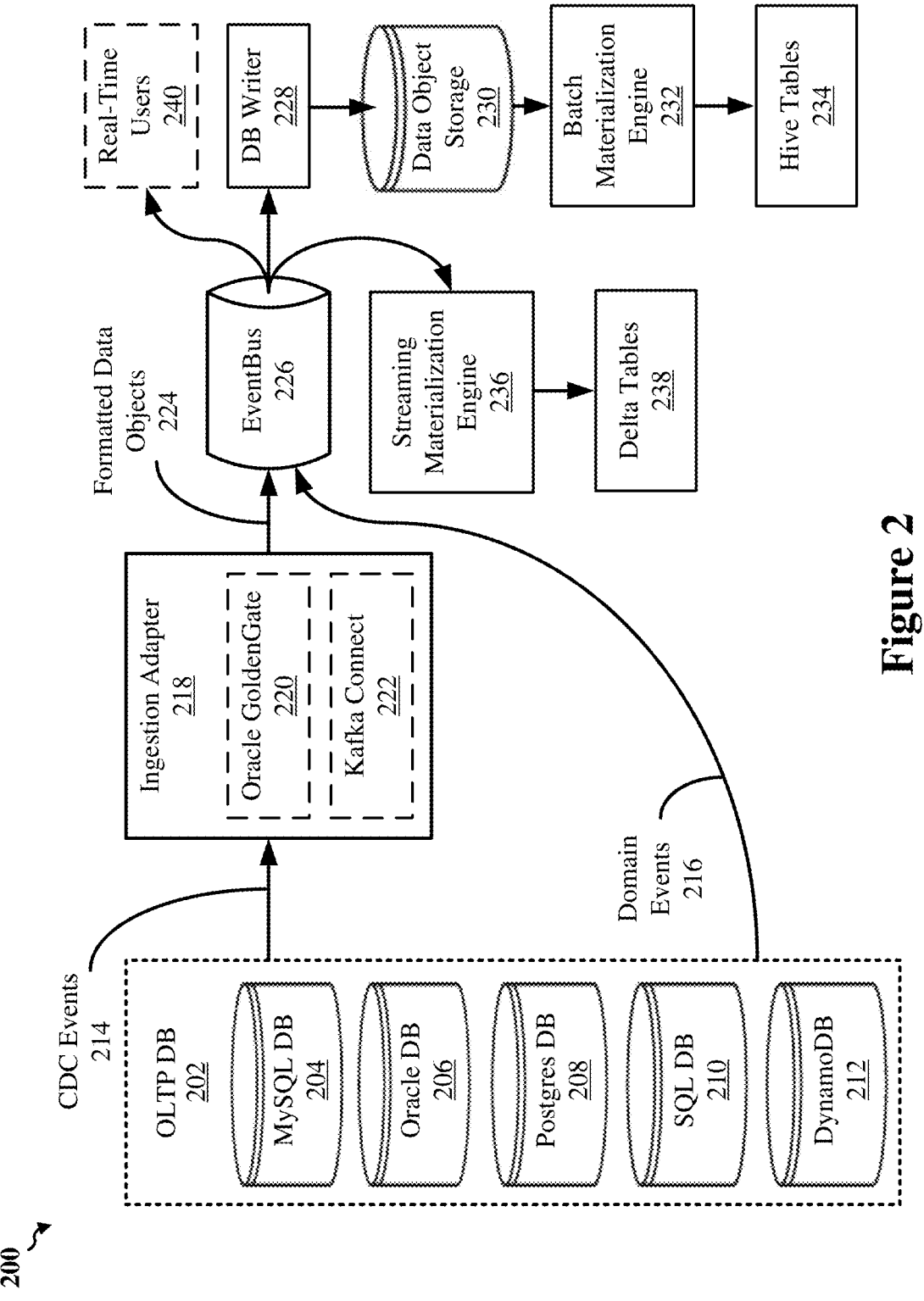
FIG. 2 shows an example unified ingestion platform (UIP) for one or more online transaction processing (OLTP) databases and one or more online analytical processing (OLAP) databases, according to some implementations.

FIG. 1 shows an example system 100 for bootstrapping a destination database (including the partial bootstrap of a destination database), according to some implementations. The system 100 includes an interface 110, a database 120, a processor 130, a memory 135 coupled to the processor 130, a source database 140, a destination database 145, a data key retrieval engine 150, a different calculation engine 155, a destination update engine 158, an ingestion adapter 160, an event bus 170, a database writer 180, a batch materialization engine 185, and a streaming materialization engine 190. In some implementations, the various components of the system 100 may be interconnected by at least a data bus 195, as depicted in the example of FIG. 1. In other implementations, the various components of the system 100 may be interconnected using other suitable signal routing resources. The components of the system 100 may be across one or more computing devices. For example, the system 100 may be implemented in a distributed computing environment, such as using the Amazon® Web Services (AWS) platform, as depicted in FIG. 2.

The interface 110 may be one or more input/output (I/O) interfaces to receive a request to perform a bootstrap of a destination database 145 based on a data parameter. The request may be from a software platform (such as from another device instructing the bootstrapping based on an on demand or scheduled request). Alternatively, the job may be received from the system 100 itself (such as from a software platform executed by the processor 130). The interface 110 may also obtain data from the source database 140 during data retrieval or may also receive or provide inputs or outputs for continued operation of the system 100. An example interface 110 may include a wired interface or wireless interface to a network to communicably couple with other devices. The interface may also include input/output (I/O) peripherals for communicating with a local user, such as a display, mouse, keyboard, speakers, microphone, and so on.

The database 120 may store the job received by the system 100 (such as by the interface 110 or generated by a software platform executed by the system 100), the lists of data keys obtained for the source database 140 and the destination database 145 by the data key retrieval engine 150, a record of data keys identified as differing between the lists of data keys by the difference calculation engine, instructions generated by the destination update engine 158 to delete one or more data keys for the destination database 145, or other computer executable instructions or data for operation of the system 100. In some implementations, the database 120 may include a relational database capable of presenting information (such as the lists of data keys or retrieved data to be written to the destination database) as data sets capable of being manipulated using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications (such as a software platform), the data key retrieval engine 150, the difference calculation engine 155, the destination update engine 158, the ingestion adapter 160, the event bus 170, the database writer 180, the batch materialization engine 185, and the streaming materialization engine 190. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration in one device or distributed across a plurality of devices).

The memory 135, which may be a persistent memory (such as non-volatile memory or non-transitory memory), may store any number of software programs, executable instructions, machine code, algorithms, and the like that can be executed by the processor 130 to perform one or more corresponding operations or functions. For example, the memory 135 may store one or more applications, the data key retrieval engine 150, the difference calculation engine 155, the destination update engine 158, the ingestion adapter 160, the event bus 170, the database writer 180, the batch materialization engine 185, and the streaming materialization engine 190 that may be executed by the processor 130. The memory 135 may also store inputs, outputs, or other information associated with the components 150-190 of the system 100 or any other data for operation of the system 100. In some implementations, hardwired circuitry may be used in place of, or in combination with, software instructions to implement aspects of the disclosure.

The source database 140 includes one or more databases from which data to be managed by the destination database 145 is to be pulled during bootstrapping of the destination database 145. In some implementations, the source database 140 includes one or more online transaction processing (OLTP) databases, such as for web services or other offerings that may be provided to one or more users. The destination database 145 includes one or more databases to be initialized or reconstructed and to manage the data pulled from the source database 140. To note, the destination database 145 may be a data lake or include any number of storage and management components. In some implementations, the destination database 145 includes one or more online analytical processing (OLAP) databases. In this manner, the OLAP databases may be used to process the data from the OLTP databases to provide analysis or insights regarding the data stored on the OLTP databases without impacting operation of the OLTP databases. In this manner, the OLTP database can continue to assist in providing services to users without impact.

Each of the source database 140 and the destination database 145 store and manage data objects, which may be organized as rows in one or more data tables (which may also be referred to as tables). The data objects are indexed by one or more index tables that identify and are used to manage the data objects in the database. The index tables (which may also be referred to as indexes) include rows of database objects to identify the storage locations of data objects in the database. As used herein, a "data object" refers to a piece of data stored or to be stored in a database (such as in a data table), and a "database object" refers to an index table component (such as a row entry) in an index table that indexes the data objects, with the database object identifying a specific data object stored in the database.

The system 100 is configured to process the job for bootstrapping the destination database 145 (such as a partial bootstrap request) by identifying data keys of data objects deleted from the source database 140 but still being stored in the destination database 145. The system 100 thus performs a partial bootstrap to include deleting the identified data keys for the destination database 145. In this manner, the storage locations of the destination database 145 identified by the deleted data keys are no longer allocated as storing current data and can thus be written with new data. The system 100 may also delete the data objects stored at the corresponding storage locations of the destination database 145.

Referring to the data key retrieval engine 150, the engine 150 retrieves data keys from a destination index of the destination database 145 and retrieves data keys from a source index of a source database 140 (which may include one or more source indexes of one or more source databases). As used herein, a data key may refer to a primary key of an index table (which may also be referred to as an index) or another unique identifier that uniquely identifies a stored data object. For example, each data object in a source database 140 is associated with a unique primary key identifying that data object. Each primary key is stored in an index table indexing the data stored in the source database 140. For example, a structured query language (SQL) table that indexes the data stored in a database may include a column titled "PRIMARY KEY," with each row of the SQL table corresponding to a data object stored in the database (such as in one or more data tables). Each index table cell of the column PRIMARY KEY includes a unique entry that identifies the data object associated with the index table row. As such, the data key retrieval engine 150 retrieves one or more primary keys from the column PRIMARY KEY in the index table. In some implementations, the data key retrieval engine 150 sends an SQL request to the source database 140 via an application programming interface (API) to provide the entirety of the PRIMARY KEY column of the SQL table at the source database 140. The engine 150 may receive the data keys from the PRIMARY KEY column of the SQL table from the source database 140 in response to the request and write the data keys to a first list (such as a text file or another suitable formatted object) that is stored in the system 100 (such as at database 120). The data key retrieval engine 150 also sends an SQL request to the destination database 145 via the API to provide the entirety of the PRIMARY KEY column of the SQL table at the destination database 145. The engine 150 may receive the data keys from the PRIMARY KEY column of the SQL table from the destination database 145 in response to the request and write the data keys to a second list (such as another text file or another suitable formatted object) that is stored in the system 100 (such as at database 120). In some implementations, the system 100 may store the first list and the second list in one or more separate SQL tables stored in the database 120 (such as two separate SQL tables). For example, the data keys retrieved from the source index of the source database 140 may be stored in a source column of an SQL table, and the data keys retrieved from the destination index of the destination database 145 may be stored in a destination column of the same or a different SQL table. In this manner, the system 100 stores a snapshot of the data keys for the source database 140 and the destination database 145 to indicate the current state of data stored at the source database 140 and the destination database 145.

The difference calculation engine 155 is to calculate a difference between the data keys retrieved from the source database 140 (referred to as source data keys) and the data keys retrieved from the destination database 145 (referred to as destination data keys). In some implementations, the difference calculation engine 155 calculates an intersection of data keys between the source data keys and the destination data keys. The difference calculation engine 155 then calculates a result of the destination data keys minus the intersection of data keys. This result includes the data keys that are included in the destination index but are not included in the source index, which indicates the data objects that have been deleted from the source database 140 but not from the destination database 145.

For example, after retrieving the source data keys and the destination data keys, if the source data keys are listed in a column of a local SQL table in the database 120 and the destination data keys are listed in a different column of the same or a different local SQL table in the database 120, the difference calculation engine 155 compares the two columns of cell values to calculate a difference between the two columns. In the implementation of calculating an intersection between the two sets of data keys, the system 100 executes an intersection operation with the source and destination columns as inputs to query the SQL table(s) to provide the list of data keys that are included in both columns (and thus in the source index and the destination index (with the list referred to as an intersection list)). The system 100 then executes a difference operation with the intersection list and the destination column as inputs to query the SQL table including the destination column to provide the destination data keys that are not included in the intersection list. The calculation of the final result is depicted mathematically in equation (1) below, with A being the destination data keys, B being the source data keys, and R being the final resulting data keys calculated by the difference calculation engine 155:

$$R = A - (A \cap B) \qquad (1)$$

In this manner, the difference calculation engine 155 obtains the list R of data keys indicating the data objects deleted from the source database 140. As such, the list R indicates the data keys to be removed from the destination index during a partial bootstrap of the destination database 145, thus removing the allocation of the corresponding storage locations in the destination database 145 so that new data may be written to those storage locations. The difference calculation engine 155 may store the list R in the database 120 (such as in a Java object or another suitable object).

The destination update engine 158 is to perform at least a portion of the partial bootstrap for the destination database 145. Performing the partial bootstrap includes deleting the list of data keys calculated by the difference calculation engine 155 from the destination index. For example, the destination update engine 158 retrieves the Java object storing the list R calculated by the difference calculation engine 155, scans the list R for each listed data key, and for each listed data key, provides an instruction to the database writer 180 to delete the row of the destination index corresponding to the data key for the destination database 145.

To note, performing the partial bootstrap may also include updating data objects or adding data objects in the destination database 145 if those data objects have been updated or added in the source database 140. To identify which data objects are to be updated or added, the system 100 receives data change events (which are described below with reference to FIGS. 2 and 5), with the data change events indicating which data objects were added or updated by providing the data keys of the corresponding data objects. As noted above, the system 100 (such as the data key retrieval engine 150) may retrieve and store the source data keys and the destination data keys as a snapshot of the data objects currently stored in the source database 140 and the destination database 145. In some implementations, the system 100 stores the data change events received from the source database 140. When a partial bootstrap of the destination database 145 is to be performed, the destination update engine 158 obtains the data keys from the data change events and queries the source database 140 (with the query including the data keys) via the API to provide the data objects corresponding to the data keys. In response to sending the query, the destination update engine 158 receives the data objects from the source database 140 and temporarily stores the data objects in the database 120 (with each data object linked to the stored data key identifying the data object).

With all data objects corresponding to the data keys from the data change events retrieved from the source database 140 and stored in the database 120, the destination update engine 158 sends instructions to the database writer 180 (or alternatively via the API to the destination database 145) to update the destination database 145 with the data objects stored in the database 120. For example, a data change event indicates what data change occurred (such as updates and additions) and the data key of the data object impacted. For each stored data change event, the destination update engine 158 provides the instructions as to the data key corresponding to the data object, and the new data object to be written to the destination database 145 (which may be new data or data overwriting previously data for the data key). The destination database 145 thus replaces the old data object with the new data object if to be edited or adds the new data object if to be added based on the instructions. To note, for data keys that are instructed to be deleted (as disclosed above), the destination database 145 may also delete the old data objects as well as deleting the corresponding data keys from the destination index. In this manner, the system 100 is able to perform a partial bootstrap for the destination database 145 which accounts for deletions to data in the source database 140 to maintain the data integrity of the destination database 145. The destination update engine 158 receives a response from the destination database 145 that the partial bootstrap is complete, and the destination update engine 158 may delete the stored data change events from the database 120 that were used for the partial bootstrap.

Alternative to continuously receiving the data change event records, the data change event records may be requested from the source database 140 when a partial bootstrap is to be performed. In this manner, the system 100 may request the source database 140 (such as via the API) to search for specific data change event records (such as data change event records that comply with a data parameter as described below) and provide the data change event records to the system 100 (with the data change event records indicating the data keys of data objects impacted by the data change events). The handling of the addition or editing of data objects at a destination database 145 for a partial bootstrap is described in more detail below (especially with reference to FIG. 5).

In some implementations, a partial bootstrap is based on a data parameter. For example, a system 100 may periodically perform a partial bootstrap to maintain data integrity (such as nightly), with the data objects impacted during the last day at the source database 140 to be the only data objects impacted at the destination database 145 by the partial bootstrap. In another example, a shard (such as a specific database disc) may be impacted such that the partial bootstrap is to ensure that the data objects of the shard at the source database 140 and the destination database 145 remain synchronized.

In some implementations, the data parameter includes one or more of a defined time period (such as the last 24 hours, another suitable interval, or a manually defined time period), a defined set of data keys (such as a specific list of primary keys), or a defined shard (such as one or more specific shards identified, with the source database 140 being configured for data sharding). In this manner, the partial bootstrap may be based on one or more of a time period, a set of data keys, or a shard. For example, the system 100 may execute a partial bootstrap for data modified (such as added, updated, or deleted) during a defined time period, for a defined set of data keys, or for data stored in a data shard (referred to as a shard) of the one or more source databases. To note, the request for the partial bootstrap may include the data parameter. Alternatively, the data parameter may be predefined in the system 100. For example, if a partial bootstrap is periodically performed, the data parameter may be defined as the time period since the last partial bootstrap. As used herein, a shard may include one or more shards, with each shard referring to a defined portion of the data stored at the source database 140 that is stored at a single location (such as on a same disc, partition, or other storage segment) or referring to the single location storing the data. For example, the source database 140 may be enabled for data sharding, with source data partitioned and the data partitions stored in different locations of the source database 140 (such as in separate databases, discs, sectors, etc.). In such an example, a data shard (or shard) may refer to the data partition itself or the storage location storing the data partition.

If the data parameter includes a time period, all data keys may be pulled from the source index and the destination index to determine which data keys exist in the destination index but not in the source index. However, the data keys for data objects to be retrieved from the source database 140 for writing to the destination database 145 for the partial bootstrap (such as for editing or adding data objects to the destination database 145) is based on the time period. For example, the source index for the source database 140 may include a column with cell values indicating the last time that the corresponding data object was last updated. In some implementations, the source index may include a column (referred to as a data change column) that stores, for each row, an indication of the last data change event impacting the data object corresponding to the row. The indication includes a date and time stamp of when the data change event occurred. In some implementations, the indication may also indicate the type of data change (such as whether an addition of or edit to the data object). In requesting the data keys from the source database 140, the data key retrieval engine 150 may request (via the API) for the source database 140 to provide the data keys corresponding to a data change event record date and time stamp that complies with the time period.

Thus, for the destination update engine 158 to perform the partial bootstrap of the destination database 145 based on the time period, the source database 140 may sort the source index (such as an SQL table) based on the data change column entries (thus sorting based on the date and time stamps) and filter the sorted table to generate a list of data keys associated with data change events occurring during the time period. For example, if the time period is the last 24 hours, the destination update engine 158 uses a current date and time stamp from the system 100, calculates the date and time stamp to be used for filtering the data keys to be one day earlier, and provides the calculated date and time stamp to the source database 140 to search for and provide the data keys with data change column date and time stamps subsequent to the calculated date and time stamp. The destination update engine 158 may also request the data objects for the identified data keys and write the received data keys and data objects to a local object of data objects to be written to the destination database 145.

To note, since the data change events do not capture deletions to data, the system 100 may still use the list of all source data keys and the list of all destination data keys to compare the two lists to identify which data objects may have been deleted from the source database 140. As such, the use of the data change column to limit the data keys used for the partial bootstrap may be for additions or edits to data for the partial bootstrap, while all data keys are still considered to identify data objects deleted from the source database 140 for the partial bootstrap.

If the data parameter includes a defined set of data keys, the request to perform the bootstrap may include the specific set of data keys. For example, the data parameter may include a list of private keys that may be included in the source index for the source database 140 and/or the destination index for the destination database 145. In some implementations, the data key retrieval engine 150 queries the source database 140 with the set of data keys as inputs to provide which data keys appear in the source index. The data key retrieval engine 150 also queries the destination database 145 with the set of data keys as inputs to provide which data keys appear in the destination index. The data key retrieval engine 150 receives the sets of source data keys and destination data keys in response to sending the requests and stores the sets as a snapshot of the current data stored in the source database 140 and the destination database 145 specific to the set of data keys in the data parameter. In this manner, the system 100 is not required to retrieve and store all data keys from the source database 140 and the destination database 145, including for identifying deletions to the source database 140.

With the source data keys and destination data keys that are stored being abbreviated based on the defined set of data keys, the comparison of source data keys and destination data keys performed by the difference calculation engine 155 (such as in calculating list R from equation (1) above) is limited to the abbreviated lists of source data keys and destination data keys retrieved and stored by the data key retrieval engine 150 based on the defined set of data keys. In this manner, the identification of any deletions of data objects is limited to the data objects corresponding to the data keys in the defined set of data keys of the data parameter. In addition, the retrieval of data objects by the destination update engine 158 from the source database 140 is limited to the list of source data keys retrieved and stored by the data key retrieval engine 150. As such, the partial bootstrap of the destination database 145 is limited to impacting data keys included in the defined list of data keys in the data parameter and the data objects corresponding to those data keys.

If the data parameter includes a shard (which may be one or more data shards), the request to perform the bootstrap may indicate the specific shard of data to be synchronized between the source database 140 and the destination database 145. For example, the data parameter may include an identification of a specific shard of the source database 140, with the source database 140 being configured for data sharding and identifying the different data shards used by the source database 140. Alternatively, the data parameter may include an identification of a specific shard of the destination database 145, with the destination database 145 being configured for data sharding and identifying the different data shards used by the destination database 145. In some implementations, the shards may be the same for both the source database 140 and the destination database 145. The index for the database configured for data sharding may include a data shard column, with each entry in the data shard column storing the data shard identification (ID) to which a data object corresponding to the row including the entry belongs. As such, the data key retrieval engine 150 queries the database including the index with the data shard ID as an input for the database to provide the data keys corresponding to the data shard ID. In response, the data key retrieval engine 150 receives the data keys corresponding to the shard ID and stores the data keys in a similar manner as described above with reference to the defined set of data keys being included in the data parameter. If the other database uses the same shard formatting, the data key retrieval engine 150 may also query the other database with the data shard ID as an input for the database to provide the data keys corresponding to the data shard ID, receive the data keys, and store the data keys. If the other database does not use data shards or uses a different shard formatting, the data key retrieval engine 150 may use the stored list of data keys from the first database to query for and attempt to receive those same data keys from the other database. For example, if the source database 140 provides a set of source data keys based on the shard ID, with the set of source data keys stored in the database 120, the data key retrieval engine 150 may query the destination database 145 with the set of source data keys as an input for the destination database 145 to search for and provide the destination data keys that match the source data keys provided by the data key retrieval engine 150. In this manner, the data key retrieval engine 150 may store abbreviated lists of data keys from the source index and the destination index, with the operations of the difference calculation engine 155 to calculate a difference and the operations of the destination update engine 158 to perform the partial bootstrap being the same as described above with reference to the data parameter including a defined set of data keys. In this manner, the system 100 is not required to retrieve and store all data keys from the source database 140 and the destination database 145, including for identifying deletions to the source database 140.

In some implementations, the instructions to retrieve data keys and data objects from the source database 140 (or the destination database 145) is included in a Java program that may use the Java database connectivity (JDBC) type application programming interface (API) to access the database. In this manner, component 150 of system 100 may be implemented in software (such as a Java program) that is executed by the processor 130 in order to perform JDBC pull operations from the indexes and data tables to collect the data keys and data corresponding to the data keys. To note, components 155 and 158 of system 100 may also be implemented in software, with the component 158 executed to cause the system 100 to generate instructions for the database writer 180 to update the destination database 145 (including the destination index).

As noted above, the destination database 145 may be synchronized to the source database 140, with the system 100 performing data pulls (such as JDBC data pull operations) from the source database 140, formatting the pulled data, and writing the data to the destination database 145. For ingesting and formatting data objects from the source database 140, the ingestion adapter 160 includes one or more interface adapters for ingesting data from the source database 140, formatting the data, and providing the data to the event bus 170. In some implementations, the ingestion adapter 160 includes the Apache Kafka® Connect component of Apache Kafka, which ingests and integrates data from different data sources. In some implementations, the ingestion adapter 160 may include Oracle® GoldenGate for ingesting data from different data sources.

In some implementations of the destination database 145 being synchronized with the source database 140, the data in one or more online transaction processing (OLTP) databases is to be synchronized to one or more online analytical processing (OLAP) databases. As such, changes in the source database 140 (such as one or more OLTP databases) are to be received and used to synchronize the data in the destination database 145 (such as one or more OLAP databases). As such, the changes in the source database 140 are indicated by the source database 140 in change data capture (CDC) events. To note, a CDC event is an example of a data change event. For example, each time a change in a data object or an addition of a data object occurs at the source database 140, a CDC event is triggered at the source database 140. A CDC event may capture the changes in the source database 140, which is serialized into a format that includes information about the associated change, such as a timestamp of and the data before and after the change. The format of the CDC event may be any suitable format ingestible by the ingestion adapter 160. In addition to CDC events that identifies changes to the data, any other changes in the domain state for the source database 140 may be triggered as domain events. For example, a domain event may be triggered based on a user logging into a service or website for which the source database 140 stores data or otherwise assists. A domain event may be in a defined format for input directly into the event bus 170. As noted above, such events may be stored by the system 100 for use in performing a partial bootstrap of the destination database 145.

The event bus 170 includes one or more buses to receive the formatted data object from the ingestion adapter 160 based on the CDC events and the domain events from the source domain, and the event bus 170 may provide the data and events to one or more components for synchronizing data or to cause other operations to be performed. For example, an OLAP database may be updated based on data from CDC events received at the event bus 170 from an OLTP database (via the ingestion adapter 160). The database (DB) writer 180 receives CDC event based data from the event bus 170 and writes data in a raw form to a data object storage, with the data processed in the storage and written to the destination database 145 via a materialization engine (materializer). As used herein, a materialization process performed by a materializer refers to the replication of data or information from the source database 140 (such as from one or more OLTP databases or other domain sources) to the destination database 145 (such as to one or more OLAP databases).

The batch materialization engine 185 (batch materializer) processes batches of data objects from the event bus and stored in the data object storage and writes the processed data objects to the destination database 145. As such, the DB writer 180 processes a batch of data from the event bus 226 and places the batch of data in the data object storage, with the batch materializer 185 processing the batch of data to synchronize the destination database 145 to include the batch of data objects. In synchronizing the destination database 145, one or more index tables to index the data in the destination database 145 (such as one or more Apache Hive tables in the Apache Parquet file format) may be generated or updated based on the changes to the data in the destination database 145. To note, while batch materialization is scalable and may be cost effective for larger materialization processes since not time critical, batch materialization may not be close to real-time.

The streaming materialization engine 190 (streaming materializer) is to perform the materialization process in near real-time (referred to simply herein as real-time), with the streaming materializer 190 to retrieve events from the event bus 170 and write the data in the event to a specific destination in the destination database 145. To ensure data integrity and to allow quick access to the data soon after writing to the destination database 145, one or more delta tables may be updated, with the delta tables indexing the data provided by the streaming materializer 190 and now stored at the destination database 145.

The components 160-190 of system 100 in FIG. 1 may be part of a unified ingestion platform (UIP). The UIP may be configured to ingest data from a plurality of different data sources and manage and synchronize the data into a data destination. As described herein, the UIP ingests data from the source database 140 (which may include a plurality of different data sources) and manages and synchronizes the data to the destination database 145 (which may include a data lake or another suitable data storage and management system). In some implementations, the materialization process for a UIP may be between one or more OLTP databases and one or more OLAP databases. As such, bootstrapping the destination database may refer to bootstrapping an OLAP database from one or more OLTP databases. For example, a data lake to store the data from the OLTP databases (and domain event data, in some implementations) for the source domain may be partially bootstrapped by the system 100 using the processes described herein.

FIG. 2 shows an example UIP 200 for one or more OLTP databases and one or more OLAP databases, according to some implementations. To note, while the OLAP database is not depicted in FIG. 2, the tables 234 and 238 depict the index tables that may index the data in the OLAP database.

The OLTP database 202 is an example implementation of the source database 140 of system 100 in FIG. 1, the ingestion adapter 218 is an example implementation of the ingestion adapter 160 of system 100 in FIG. 1, the event bus 226 (EventBus) is an example implementation of the event bus 170 of system 100 in FIG. 1, the DB writer 228 is an example implementation of the DB writer 180 of system 100 in FIG. 1, the batch materializer 232 is an example implementation of the batch materializer 185 of system 100 in FIG. 1, and the streaming materializer 236 is an example implementation of the streaming materializer 190 of system 100 in FIG. 1. In some implementations, the UIP is implemented using the Amazon® Web Services (AWS) cloud computing environment.

As depicted, the OLTP database 202 may include a plurality of data sources, such as a MySQL database 204, an Oracle database 206, a PostgreSQL (Postgres) database 208, an SQL database 210, and an Amazon® DynamoDB 212. To note, "database" used in the referred examples may refer to any suitable storage, which may include a single storage location or a distributed storage system (such as a cloud based storage solution, which may include many of the databases 204-212). To ensure synchronization between the OLTP data sources and the OLAP database (such as a data lake), CDC events 214 from the OLTP database 202 (such as from one or more of the data sources 204-212) are ingested by the ingestion adapter 218, formatted, and provided as formatted data objects 224 to the event bus 226. For example, a CDC event 214 from the Oracle database 206 or from the other databases may be ingested by the Oracle GoldenGate adapter 220, which formats the CDC event 214 into the formatted data object 224 and provided to the event bus 226. In another example, a CDC event 214 from a data source may be ingested by the Apache Kafka Connect adapter 222, which formats the data object 224 before providing the formatted data object 224 to the event bus 226. The ingestion adapter 218 is configured to format the data objects 224 into a specific format as defined for the UIP 200 (referred to herein as a "UIP format").

As noted above, domain events 216 may also be received by the event bus 226 from the data source domain (depicted as coming from the OLTP database 202 in FIG. 2). For example, domain events 216 may be received by the event bus 226 from an intrusion prevention system (IPS) for the data source domain. The IPS triggers a domain event 216 when an intrusion behavior or attack is detected, such as trojan horses, worms, or spyware attempting to be loaded into the data source domain. In another example, domain events 216 may be received by the event bus 226 from an outbox service. The outbox service may store and transmit messages regarding the transactions that occur at a data source domain (such as changes to the data or interactions that occur within the data source domain). Otherwise, domain events 216 may be received by the event bus 226 from the data source domain for any other domain changes that trigger a domain event 216. In some implementations, a domain event 216 is in the Event-Carried State Transfer (ECST) format for a distributed system, such as the OLTP database 202.

The event bus 226 may act as a temporary storage of data objects 224 and domain events 216 as received from the data source. In the example UIP 200, CDC events 214 may be processed in batches by the batch materializer 232, and domain events 216 may be processed in near real-time by the streaming materializer 236. For example, routine changes in data objects may not require immediate attention, and as such, batch processing of the CDC event based data objects may be an efficient use of resources. In contrast, domain events 216 (such as from the IPS based on an attack on a data source) may be time sensitive, and as such, may require real-time processing. As such, for batch processing, the DB writer 228 may read a batch of the data objects 224 in the UIP format based on the CDC events 214 from the event bus 226. For real-time processing, the streaming materializer 236 may read the domain events 216 in the ECST format from the event bus 226 as they are received. In some implementations, real-time users 240 (such as a user device) may have direct access to the event bus 226. In this manner, a user may be alerted in real-time of a domain event 216.

Referring to the batch processing of the formatted data objects 224, the DB writer 228 receives a batch of data objects 224 from the event bus 226, processes the batch of data objects 224, and writes the batch of data objects 224 to the data object storage 230. In some implementations, the data object storage 230 is the Amazon Simple Storage Service (S3) of AWS, and the DB writer 228 is the S3 writer for writing data to S3. As such, the S3 writer (as the DB writer 228) writes the batch of processed data objects from the event bus 526 to an S3 location (such as one or more S3 buckets).

The batch materialization engine 232 reads the processed data objects from the data object storage 230 (such as from the one or more S3 buckets), processes the data objects, and writes the data objects to the destination database (such as a data lake). With the data objects stored in the data lake, the Apache Hive tables 234 indexing the data in the data lake are generated or updated to index the new or updated data in the data lake.

Referring to the real-time processing of the domain events 216, the streaming materializer 236 transfers the domain event data from the event bus 226 to a defined destination in the destination database (such as a specific location in the data lake or in a separate data lake). The delta tables 238 indexing the changes in the data lake based on the streaming materialization are generated or updated to index the changes in the data lake.

With reference to the UIP 200 in FIG. 2, bootstrapping of a destination database (such as partial bootstrapping) may refer to the reconstruction of a portion of the data lake or the data lake itself so that the portion of the data lake is synchronized with the OLTP database 202 (and thus stores the data of the OLTP database 202). If the partial bootstrap is based on a data parameter, the portion of the data lake that is synchronized with the OLTP database 202 is based on the data parameter. As such, the processes and system described herein may be implemented for the partial bootstrapping of a destination database for the UIP 200. However, the processes and system described herein may also be implemented for the partial bootstrapping of any suitable destination database 145 based on a source database 140.

Figure 3:
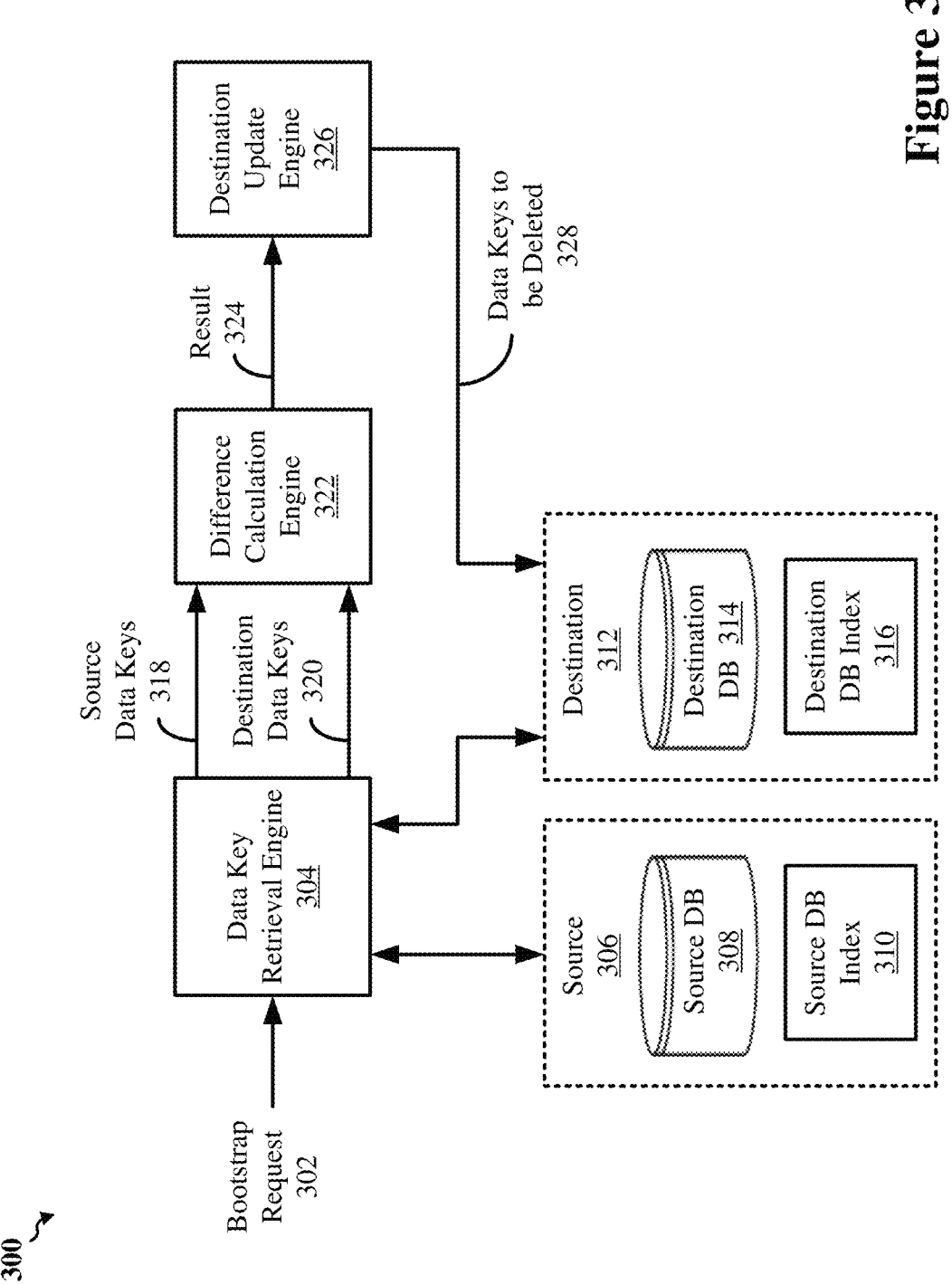
FIG. 3 shows an example block diagram for partial bootstrapping of a destination database based on a data parameter for one or more source databases, according to some implementations.

FIG. 3 shows an example block diagram 300 for partial bootstrapping a destination database (DB) 314 based on a data parameter for one or more source databases, according to some implementations. The block diagram 300 is described with reference to system 100 in FIG. 1, and in particular UIP 200 in FIG. 2. To note, the one or more source databases are depicted in FIG. 3 as a source DB 308 for clarity. While an index may be stored in the database for which the index indexes data, the source index is depicted as separate from the source DB 308 as the source DB index 310 for clarity, with the source DB 308 and the source DB index 310 together being referred to as the source 306. Similarly, the destination index is depicted as separate from the destination DB 314 as the destination DB index 316 for clarity, with the destination DB 314 and the destination DB index 316 together being referred to as the destination 312. The source 306 is an example implementation of the source database 140, the destination 312 is an example implementation of the destination database 145, the data key retrieval engine 304 is an example implementation of the data key retrieval engine 150 in FIG. 1, the difference calculation engine 322 is an example implementation of the difference calculation engine 155 in FIG. 1, and the destination update engine 326 is an example implementation of the destination update engine 158 in FIG. 1. To note, one source 306 including one source DB 308 and one source DB index 310 is depicted in FIG. 3 for clarity as representing one or more source databases that include one or more source indexes. The one or more source databases may be communicably coupled with the system 100 via a common API, such as the JDBC API described above.

The block diagram 300 is depicted as regarding the deletion aspect for the partial bootstrap, with additional operations for the partial bootstrap occurring for the addition aspect and the editing aspect of the partial bootstrap. Operation of the block diagram 300 for performing the deletion component of a partial bootstrap of the destination 312 is described with reference to the flow chart depicted in FIG. 4. FIG. 4 shows an illustrative flow chart of an example operation 400 of partial bootstrapping a destination database, according to some implementations. FIG. 3 and FIG. 4 are described below concurrently, with components of the system 100 (and in particular of the UIP 200) performing operation 400 and as depicted in the block diagram 300.

Referring to the example operation 400, at 402, the system 100 receives a request to perform a bootstrap of the destination database 145 based on a data parameter. For example, the data key retrieval engine 304 may receive the bootstrap request 302 from a software platform that generated the request 302, with the bootstrap request 302 indicating to perform a partial bootstrap of the destination 312. The software platform may be executed by the processor 130 of the system 100 or by an external device, with the request received via the interface 110. In some implementations, the bootstrap request 302 includes the data parameter. As noted above, the data parameter may indicate one or more of a time period, a defined set of data keys, or a shard. To note, the destination database 145 is in use. For example, an OLAP database (such as a data lake) synchronized with the OLTP database 202 may be used to provide analysis of the data from the OLTP database 202 that is stored on the OLAP database. As such, a full bootstrap of the destination database was previously performed and the destination database is active (404), with only a portion of the destination database to be reconstructed from the partial bootstrap.

At 406, the system 100 (such as the data key retrieval engine 150) retrieves a first plurality of data keys from a destination index of the destination database 145 storing the data. The data keys point to the data stored in the destination database (408). For example, the data key retrieval engine 304 may access the destination 312 to retrieve a list of data keys from the destination DB index 316, with the data keys pointing to the data objects stored in the destination DB 314. In some implementations, the data key retrieval engine 304 generates and formats a set of SQL queries for a JDBC API to retrieve the first plurality of data keys from the destination DB index 316, with the destination DB index 316 including one or more SQL tables. The data key retrieval engine 304 then provides the set of SQL queries to the JDBC API to provide the queries to the destination 312 (such as the destination DB 314 managing the destination DB index

316). Execution of the SQL queries cause a scan of the destination DB index 316 to pull the first plurality of data keys, and the first plurality of data keys are returned to the system 100 (such as the data key retrieval engine 304) via the interface 110. Alternatively, the queries may be provided directly to the component managing the destination index, such as the S3 component of the AWS. Referring to FIG. 2, the access and scan for the data keys may be at the Hive tables 234 that index the data in the data object storage 230 (such as an S3 storage), with the Hive tables 234 returning the first plurality of data keys. While not depicted for clarity, the data key retrieval engine 304 may store the retrieved destination data keys 320 in a local SQL table, Java object, or other suitable storage object (which may be stored in the database 120).

At 410, the system 100 (such as the data key retrieval engine 150) retrieves a second plurality of data keys from one or more source indexes of one or more source databases storing the data. The data keys point to the data stored in the one or more source databases (412). Similar to as performed in retrieving the first plurality of data keys, the data key retrieval engine 304 may access the source 306 to retrieve a list of data keys from the source DB index 310, with the data keys pointing to the data objects stored in the source DB 308. In some implementations, the data key retrieval engine 304 generates and formats a set of SQL queries for a JDBC API to retrieve the second plurality of data keys from the source DB index 310, with the source DB index 310 including one or more SQL tables. The data key retrieval engine 304 then provides the set of SQL queries to the JDBC API to provide the queries to the source 306 (such as the source DB 308 managing the source DB index 310). Execution of the SQL queries cause a scan of the source DB index 310 to pull the first plurality of data keys, and the first plurality of data keys are returned to the system 100 (such as the data key retrieval engine 304) via the interface 110. Referring to FIG. 2, the access and scan for the data keys may be at the source indexes for the different databases of the OLTP DB 202, with the data keys being provided by the corresponding database via the JDBC API. While not depicted for clarity, the data key retrieval engine 304 may store the retrieved source data keys 318 in a local SQL table, a Java object, or other suitable storage object (which may be stored in the database 120).

In some implementations, all data keys are retrieved from the destination index and all data keys are retrieved from the one or more source indexes. However, if the partial bootstrap is based on a data parameter, in some implementations, the data keys that are retrieved from the destination index and the one or more source indexes may be a subset of all of the data keys. For example, as noted above, if the data parameter includes a set of data keys, the set of data keys may be provided as an input with the queries for an index so that only those data keys in the set that exist at the index are provided from the index. Similarly, if the data parameter includes a shard, a shard ID may be provided as an input with the queries for an index so that only those data keys of data objects in the shard are provided from the index. In this manner, deletions of data at the source index impact the partial bootstrap only if corresponding to the set of data keys or the shard. As such, the source data keys 318 may not include all of the data keys stored at the source DB index 310, and the destination data keys 320 may not include all of the data keys stored at the destination DB index 316. Conversely, if the data parameter exclusively includes a time period, all data keys may be retrieved. In this manner, the system 100 is able to identify if any deletions occurred across any of the data in the source database in order to perform the partial bootstrap. As such, the source data keys 318 may include all of the data keys stored at the source DB index 310, and the destination data keys 320 may include all of the data keys stored at the destination DB index 316.

At 414, the system 100 (such as the difference calculation engine 155) calculates a difference between the first plurality of data keys and the second plurality of keys. The difference includes one or more data keys included in the first plurality of data keys and not included in the second plurality of data keys (416). For example, the difference calculation engine 322 compares the source data keys 318 and the destination data keys 320 to calculate a difference between the keys 318 and 320. In particular, the difference calculation engine 322 identifies one or more destination data keys 320 that do not exist in the source data keys 318.

In some implementations, the difference calculation engine 322 receives a first object from storage that includes the list of source data keys 318 (as the second plurality of data keys) and receives a second object from storage that includes the list of destination data keys 320 (as the first plurality of data keys). The difference calculation engine 322 calculates an intersection of data keys between the first plurality of data keys and the second plurality of data keys (which indicates the data keys included in both lists). The difference calculation engine 322 then calculates a result 324 of the first plurality of data keys (the list of destination data keys) minus the intersection of data keys (which indicates the data keys included in both lists). The result 324 is the difference including the one or more data keys that are included in the first plurality of data keys (the list of destination data keys) and not included in the second plurality of data keys (the list of source data keys). The calculated result 324 thus includes the data keys of data objects that have been deleted from the source 306.

At 418, the system 100 (such as the destination update engine 158) deletes the one or more data keys from the destination index to generate an updated destination index. For example, with the result 324 calculated by the difference calculation engine 322 listing the data keys 328 to be deleted from the destination 312, the destination update engine 326 generates instructions with the data keys 328 as an input to delete the data keys 328 from the destination DB index 316. The instructions are transmitted to the destination 312 to cause the destination DB 314 to delete the data keys 328 from the destination DB index 316. Referring to FIG. 2, the destination update engine 326 generates instructions that are provided to the management component of the Hive tables 234 including the data keys that index the data in the data object storage 230 (such as an S3 storage). For each data key 328, the row in the Hive table 234 including the data key 328 is deleted. In this manner, the data object storage 230 locations (such as S3 bins) previously allocated to those keys may be written with new data.

In some implementations, the system 100 also deletes the data in the destination database 145 corresponding to the one or more data keys deleted from the destination index (420). For example, the DB writer 228 may receive instructions from the destination update engine 326 to scan for the one or more data keys in the data object storage 230 and delete the corresponding data objects when found. The one or more data keys may thus be deleted from the hive tables 234 when updating the tables in response to the deletions and other data edits at the data object storage 230. As such, the system 100 performs the partial bootstrap of the destination database 145 based on the request, which includes deleting the data in the destination database 145 corresponding to the one or more data keys deleted from the destination index. As noted above, the partial bootstrap may also include edits to existing data and additions to the data in the destination database 145 based on one or more data change events that satisfy the data parameter (such as occurring within the time period, occurring to source data objects corresponding to a set of data keys, or occurring to source data objects of a shard). The partial bootstrap including such operations is described with reference to FIG. 5.

While the above operations of the partial bootstrap depicted in FIG. 4 may be regarding the deletion of data and data keys, performing the partial bootstrap may also include the merging of data objects corresponding to some data change events (referred to as source domain events or domain events) that are stored at the one or more source databases into the destination database. Other than the deletion of source data, a domain event may cause a change to the source data (such as the addition or editing of data objects in the source database 140), and each domain event for the editing or addition of source data objects, including the source data objects impacted, is logged as a domain event record at the source database 140. As a reminder, deletions to data objects are not logged in a domain event record. In addition to the deletion of data objects, the partial bootstrap may also include the resolution of potential differences in data objects between the source database 140 and the destination database 145 based on the domain event records by adding or updating data stored at the destination database 145. As with the deletion of data keys and data objects from the destination database 145, such resolution may be based on the data parameter. As such, the partial bootstrap may only synchronize data objects and data keys for domain events that comply with the data parameter (such as occurring within a defined time period, impacted a defined set of data keys, or impacting data from a defined shard).

FIG. 5 shows an illustrative flow chart of an example operation 500 for synchronizing a destination database during a partial bootstrap, according to some implementations. Operation 500 is described below as being performed by the system 100 to perform a partial bootstrap of the destination database 145 in synchronizing to the source database 140 for clarity. Operation 500 is performed in conjunction with operation 400 in FIG. 4 for the system 100 to perform a partial bootstrap, with block 502 of operation 500 being the same as block 420 of FIG. 4. To note, block 502 (along with operation 400) is regarding the deletion of data in the destination database 145 based on a data parameter, while blocks 504-506 are regarding the addition and editing of the data in the destination database 145 based on a data parameter. In this manner, the system 100 may perform operation 500 in conjunction with operation 400 to complete the partial bootstrap.

At 502, the system 100 deletes the data in the destination database 145 corresponding to one or more data keys to be deleted from the destination index. As noted above with reference to block 416, the one or more data keys are data keys included in the destination index and not included in the source index, thus indicating the data objects that have been deleted from the source index. As such, the system 100 may instruct the DB writer 180 to scan for the one or more data keys in the destination database 145 and delete the data objects for the identified one or more data keys in the destination database 145.

At 504, the system also retrieves a plurality of domain event records stored for the one or more source databases based on the data parameter. To note, the plurality of domain event records correspond to a subset of data stored in the one or more source databases (506), which is to be synchronized with the destination database. In some implementations, the system 100 generates queries with the data parameter as an input for the source database 140 to crawl the domain event records and identify the domain event records that comply with the data parameter, with the queries provided to the source database 140 via an API (such as the JDBC API). The source database 140 returns the plurality of domain event records that comply with the data parameter via the API, with each domain event record indicating the one or more data keys of data objects impacted by the domain event.

At 508, the system 100 pulls exclusively the subset of data stored in the one or more source databases corresponding to the plurality of domain event records. Since the partial bootstrap is based on the data parameter, the retrieved domain event records that comply with the data parameter indicate the exclusive set of data keys of data objects to be added or edited during the partial bootstrap. In this manner, other destination data objects not corresponding to data keys in the retrieved domain event records are not impacted. In some implementations, the system 100 retrieves the source data keys from the plurality of domain event records to generate a list of source data keys. The system 100 then generates and provides queries (such as via the JDBC API) to the source data 140 with the list of source data keys as an input for the source database 140 to pull and provide the corresponding source data objects. The system 100 may thus store the data objects and corresponding data keys (such as key value pairs) in an object to be used as an input to the queries to update the destination database 145.

At 510, the system 100 merges the pulled subset of data into the destination database 145. For example, the system 100 generates and provides instructions to the DB writer 180 with the object including the data keys and associated data objects to update the destination database 145. In response, the DB writer 180 searches for the each of the data keys and overwrites the currently stored data object with the received data object for the data key. In some implementations, in response to the changes to the data objects in the destination database, the destination index is updated. For example, if the data object storage 230 (such as one or more S3 bins) is updated, the hive tables 234 are automatically updated in response. In this manner, in addition to the partial bootstrap handling deletions of data objects, the partial bootstrap handles the addition and editing of data objects based on a data parameter.

To note, deleting, editing, or adding data for the destination database may be performed in sequence or concurrently. For example, the system 100 may generate a single set of instructions for the DB writer 180 to add, edit, and delete specific data objects of the destination database 145.

Described herein are systems and methods to perform a unique partial bootstrap that accounts for deletions to data in a data source. In this manner, partial bootstraps are able to be used to synchronize a destination (such as data lake) with one or more source databases without requiring the use of full bootstraps. As such, computing and time resources may be used efficiently to maintain data integrity at a destination.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c. In addition, the term "document" may be used interchangeably with "electronic document" or "computer readable document" based on how used above.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus. For example, while various examples herein describe a data key retrieval engine, a difference calculation engine and a destination update engine as performing operations of a partial bootstrap (such as depicted in operation 400 in FIG. 4 and operation 500 in FIG. 5) for clarity, the engines may be software components executed by a processor, and the processor may execute the instructions to perform and/or instruct other devices (such as one or more databases) to perform the operations depicted in FIG. 4 and FIG. 5.

If implemented in software, the functions may be stored on or transmitted over as one or more instructions or code on a computer readable medium. The processes of a method or algorithm disclosed herein may be implemented in a processor-executable software module which may reside on a non-transitory computer readable medium. Computer readable media includes both computer storage media and communication media including any medium that can be enabled to transfer a computer program from one place to another. A storage media may be any available media that may be accessed by a computer. By way of example, and not limitation, such computer readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. While disk and disc may include compact disc (CD), laser disc, optical disc, digital versatile disc (DVD), floppy disk, and Blu-ray disc where disks usually reproduce data magnetically and discs reproduce data optically with lasers, disc and disk is used interchangeably herein to refer to any non-transitory storage means, which may include optical storage means (such as a CD), magnetic storage means (such as a hard drive), or silicon based storage means (such as a solid state drive). Combinations of the above should also be included within the scope of computer readable media. Additionally, the operations of a method or algorithm may reside as one or any combination or set of codes and instructions on a machine readable medium and computer readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. While the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for partial bootstrapping a destination database, the method comprising:

receiving a request to perform a bootstrap of a destination database based on a data parameter, wherein a full bootstrap of the destination database was previously performed and the destination database is active;

retrieving a first plurality of data keys from a destination index of the destination database storing the data, wherein each of the first plurality of data keys from the destination index points to a respective data object stored in a corresponding location within the destination database;

retrieving a second plurality of data keys from one or more source indexes of one or more source databases storing the data, wherein each of the second plurality of data keys points to a respective data object stored in the one or more source databases;

calculating a difference between the first plurality of data keys and the second plurality of data keys, wherein the difference includes one or more data keys included in the first plurality of data keys and not included in the second plurality of data keys; and deleting the one or more data keys from the destination index to generate an updated destination index in which the corresponding locations in the destination database are de-allocated without performing another full bootstrap.

2. The method of claim 1, wherein calculating the difference between the first plurality of data keys and the second plurality of data keys includes:

calculating an intersection of data keys between the first plurality of data keys and the second plurality of data keys; and calculating a result of the first plurality of data keys minus the intersection of data keys, wherein the result is the difference including the one or more data keys.

3. The method of claim 2, further comprising performing a partial bootstrap of the destination database based on the request, wherein performing the partial bootstrap includes deleting the data in the destination database corresponding to the one or more data keys to be deleted from the destination index.

4. The method of claim 3, wherein performing the partial bootstrap further includes:

retrieving a plurality of domain event records stored for the one or more source databases based on the data parameter, wherein the plurality of domain event records correspond to a subset of data stored in the one or more source databases;

pulling exclusively the subset of data stored in the one or more source databases corresponding to the plurality of domain event records; and merging the pulled subset of data into the destination database.

5. The method of claim 1, wherein the data parameter includes a time period.

6. The method of claim 1, wherein the data parameter includes a set of data keys.

7. The method of claim 1, wherein:

the destination database comprises an online analytical processing (OLAP) destination database; and the one or more source databases comprise one or more online transaction processing (OLTP) source databases.

8. The method of claim 1, wherein the difference between the first plurality of data keys and the second plurality of data keys represents deletions on the one or more source databases not propagated on the destination database.

9. The method of claim 1, wherein:

the data parameter defines a data shard corresponding to a segmented portion of the one or more source databases; and each of the second plurality of data keys points to a respective data object stored in the segmented portion of the one or more source databases.

10. A computing system for partial bootstrapping a destination database, the system comprising:

one or more processors; and a memory storing instructions that, when executed by the one or more processors, causes the system to perform operations comprising:

receiving a request to perform a bootstrap of a destination database based on a data parameter, wherein a full bootstrap of the destination database was previously performed and the destination database is active;

retrieving a first plurality of data keys from a destination index of the destination database storing the data, wherein each of the first plurality of data keys from the destination index points to a respective data object stored in a corresponding location within the destination database;

retrieving a second plurality of data keys from one or more source indexes of one or more source databases storing the data, wherein each of the second plurality of data keys points to a respective data object stored in the one or more source databases;

calculating a difference between the first plurality of data keys and the second plurality of data keys, wherein the difference includes one or more data keys included in the first plurality of data keys and not included in the second plurality of data keys; and deleting the one or more data keys from the destination index to generate an updated destination index in which the corresponding locations in the destination database are de-allocated without performing another full bootstrap.

11. The system of claim 10, wherein calculating the difference between the first plurality of data keys and the second plurality of data keys includes:

calculating an intersection of data keys between the first plurality of data keys and the second plurality of data keys; and calculating a result of the first plurality of data keys minus the intersection of data keys, wherein the result is the difference including the one or more data keys.

12. The system of claim 11, wherein the operations further comprise performing a partial bootstrap of the destination database based on the request, wherein performing the partial bootstrap includes deleting the data in the destination database corresponding to the one or more data keys to be deleted from the destination index.

13. The system of claim 12, wherein performing the partial bootstrap further includes:

retrieving a plurality of domain event records stored for the one or more source databases based on the data parameter, wherein the plurality of domain event records correspond to a subset of data stored in the one or more source databases;

pulling exclusively the subset of data stored in the one or more source databases corresponding to the plurality of domain event records; and merging the pulled subset of data into the destination database.

14. The system of claim 10, wherein the data parameter includes a time period.

15. The system of claim 10, wherein the data parameter includes a set of data keys.

16. A non-transitory, computer-readable medium storing instructions that, when executed by a processor of a computing system to perform a partial bootstrap of a destination database, cause the system to perform operations comprising:

receiving a request to perform a bootstrap of a destination database based on a data parameter, wherein a full bootstrap of the destination database was previously performed and the destination database is active;

retrieving a first plurality of data keys from a destination index of the destination database storing the data, wherein each of the first plurality of data keys from the destination index points to a respective data object stored in a corresponding location within the destination database;

retrieving a second plurality of data keys from one or more source indexes of one or more source databases storing the data, wherein each of the second plurality of data keys points to a respective data object stored in the one or more source databases;

calculating a difference between the first plurality of data keys and the second plurality of data keys, wherein the difference includes one or more data keys included in the first plurality of data keys and not included in the second plurality of data keys; and deleting the one or more data keys from the destination index to generate an updated destination index in which the corresponding locations in the destination database are de-allocated without performing another full bootstrap.

17. The non-transitory, computer-readable medium of claim 16, wherein execution of the instruction to calculate the difference between the first plurality of data keys and the second plurality of data keys causes the system to:

calculate an intersection of data keys between the first plurality of data keys and the second plurality of data keys; and calculate a result of the first plurality of data keys minus the intersection of data keys, wherein the result is the difference including the one or more data keys.

18. The non-transitory, computer-readable medium of claim 17, wherein the operations further comprise performing a partial bootstrap of the destination database based on the request, wherein execution of the instructions to perform the partial bootstrap causes the system to delete the data in the destination database corresponding to the one or more data keys to be deleted from the destination index.

19. The non-transitory, computer-readable medium of claim 18, wherein execution of the instructions to perform the partial bootstrap further causes the system to:

retrieve a plurality of domain event records stored for the one or more source databases based on the data parameter, wherein the plurality of domain event records correspond to a subset of data stored in the one or more source databases;

pull exclusively the subset of data stored in the one or more source databases corresponding to the plurality of domain event records; and merge the pulled subset of data into the destination database.

20. The non-transitory, computer-readable medium of claim 16, wherein the data parameter includes one of:

a time period;

a set of data keys; or a shard of the one or more source databases.

* * * * *